(12) United States Patent
Bergmann et al.

(10) Patent No.: US 11,156,183 B2
(45) Date of Patent: Oct. 26, 2021

(54) METHOD FOR THE MODEL-BASED CONTROL AND REGULATION OF AN INTERNAL COMBUSTION ENGINE

(71) Applicant: MTU FRIEDRICHSHAFEN GMBH, Friedrichshafen (DE)

(72) Inventors: Daniel Bergmann, Ulm (DE); Michael Buchholz, Ulm (DE); Knut Graichen, Ulm (DE); Jens Niemeyer, Friedrichshafen (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 0 days.

(21) Appl. No.: 16/976,885

(22) PCT Filed: Feb. 27, 2019

(86) PCT No.: PCT/EP2019/054852
§ 371 (c)(1),
(2) Date: Aug. 31, 2020

(87) PCT Pub. No.: WO2019/170492
PCT Pub. Date: Sep. 12, 2019

(65) Prior Publication Data
US 2021/0003090 A1   Jan. 7, 2021

(30) Foreign Application Priority Data
Mar. 5, 2018   (DE) .................... 10 2018 001 727.4

(51) Int. Cl.
*F02D 41/28* (2006.01)
*F02D 41/14* (2006.01)
*F02D 41/30* (2006.01)

(52) U.S. Cl.
CPC .......... *F02D 41/28* (2013.01); *F02D 41/1401* (2013.01); *F02D 41/3005* (2013.01); *F02D 2041/1433* (2013.01); *F02D 2200/06* (2013.01)

(58) Field of Classification Search
CPC .. F02D 41/28; F02D 41/1401; F02D 41/3005; F02D 2041/1433; F02D 2200/06;
(Continued)

(56) References Cited

U.S. PATENT DOCUMENTS 10,013,658 B2   7/2018   Streichert
10,669,962 B2   6/2020   Buchholz
(Continued)

FOREIGN PATENT DOCUMENTS

DE   102006004516 B3   3/2007
DE   102010028266 A1   10/2011
(Continued)

OTHER PUBLICATIONS

Rasmussen & C. K. I. Williams Gaussian Processes for Machine Learning; 2006.
(Continued)

*Primary Examiner* — Joseph J Dallo
(74) *Attorney, Agent, or Firm* — Lucas & Mercanti, LLP; Klaus P. Stoffel (57) ABSTRACT

A method for model-based open-loop and closed-loop control of an internal combustion engine, in which method injection system setpoint values for activating the injection system control elements are calculated dependent on a setpoint torque by a combustion model, and gas path setpoint values for activating the gas path control elements are calculated by a gas path model. The combustion model is adapted during ongoing operation of the internal combustion engine. A quality measure is calculated by an optimizer dependent on the injection system setpoint values and the (Continued)

gas path setpoint values, the quality measure is minimized by the optimizer by varying the injection system setpoint values and gas path setpoint values within a prediction horizon. The injection system setpoint values and gas path setpoint values are set by the optimizer, based on the minimized quality measure, as being definitive for setting of the operating point of the internal combustion engine.

8 Claims, 8 Drawing Sheets

(58) Field of Classification Search
CPC ..... F02D 2041/1412; F02D 2200/1002; F02D 41/401; F02D 41/005; F02D 41/2406; F02D 41/248; F02D 41/3836; F02D 41/40; F02D 41/1406; F02D 41/3845; Y02T 10/40
See application file for complete search history.

(56) References Cited

U.S. PATENT DOCUMENTS

| | | |
|---|---|---|
| 2011/0017289 A1 | 1/2011 | Park |
| 2011/0172897 A1 | 7/2011 | Tsuzuki |
| 2020/0240344 A1* | 7/2020 | Buchholz ................ F02D 41/40 |
| 2020/0240347 A1* | 7/2020 | Niemeyer ........... F02D 41/1406 |

FOREIGN PATENT DOCUMENTS

| | | |
|---|---|---|
| DE | 102013206304 A1 | 10/2014 |
| DE | 102013206308 A1 | 10/2014 |
| DE | 102013220432 A1 | 4/2015 |
| DE | 102014207683 A1 | 10/2015 |
| DE | 102014225039 A1 | 6/2016 |
| DE | 102015208513 A1 | 11/2016 |
| DE | 102015212709 A1 | 1/2017 |
| DE | 102015221819 A1 | 5/2017 |
| DE | 102015225279 A1 | 6/2017 |
| DE | 102016205241 A1 | 10/2017 |
| DE | 102017005783 A1 | 12/2018 |
| WO | 2017005337 A1 | 1/2017 |

OTHER PUBLICATIONS

Harder, Karsten Nonlinear MPC with Emission Control for a Real-World Off-Highway Diesel Engine; 2017.
Oliver Nelles Lolimot—Lokale, lineare Modelle zur Identifikation nichtlinearer, dynamischer Systeme; 1997.

* cited by examiner

METHOD FOR THE MODEL-BASED CONTROL AND REGULATION OF AN INTERNAL COMBUSTION ENGINE

CROSS-REFERENCE TO RELATED APPLICATIONS

The present application is a 371 of International application PCT/EP2019/054852, filed Feb. 27, 2019, which claims priority of DE 10 2018 001 727.4, filed Mar. 5, 2018, the priority of these applications is hereby claimed, and these applications are incorporated herein by reference.

BACKGROUND OF THE INVENTION

The invention relates to a method for the model-based open-loop and closed-loop control of an internal combustion engine, in which method injection system setpoint values for the activation of the injection system control elements are calculated in a manner dependent on a setpoint torque by means of a combustion model, and gas path setpoint values for the activation of the gas path control elements are calculated by means of a gas path model, and in which method the combustion model is adapted during the ongoing operation of the internal combustion engine. Furthermore, in said method, a quality measure is calculated by an optimizer in a manner dependent on the injection system setpoint values and the gas path setpoint values, the quality measure is minimized by the optimizer by variation of the injection system setpoint values and gas path setpoint values within a prediction horizon, and the injection system setpoint values and gas path setpoint values are set by the optimizer, on the basis of the minimized quality measure, as being definitive for the setting of the operating point of the internal combustion engine.

The behavior of an internal combustion engine is definitively determined by means of an engine control unit in a manner dependent on a power demand. For this purpose, corresponding characteristic curves and characteristic maps are implemented in the software of the engine control unit. By means of these, the control variables of the internal combustion engine, for example the start of injection and a required rail pressure, are calculated from the power demand, for example a setpoint torque. These characteristic curves/characteristic maps are populated with data by the manufacturer of the internal combustion engine in a test stand run.

The large number of such characteristic curves/characteristic maps, and the interaction of the characteristic curves/characteristic maps with one another, however give rise to a high level of outlay in terms of tuning.

In practice, it is therefore sought to reduce the outlay in terms of tuning through the use of mathematical models. For example, DE 10 2006 004 516 B3 describes a Bayesian network with probability tables for defining an injection quantity, and US 2011/0172897 A1 describes a method for adapting the start of injection and the injection quantity by means of combustion models using neural networks. Since only trained data are mapped, said data must firstly be learned during a test stand run.

The German patent application DE 10 2017 005 783.4, which does not constitute a prior publication, has disclosed a model-based open-loop and closed-loop control method for an internal combustion engine, in which method injection system setpoint values for the activation of the injection system control elements are calculated by means of a combustion model, and gas path setpoint values for the activation of the gas path control elements are calculated by means of a gas path model. Said setpoint values are then varied by an optimizer with the aim of minimizing a quality measure within a prediction horizon. The minimized quality measure then defines the best possible operating point of the internal combustion engine. With regard to a considerably reduced outlay in terms of tuning, the presented method has duly proved successful but still offers potential for optimization.

SUMMARY OF THE INVENTION

The invention therefore addresses the problem of further developing the above-described method with regard to improved quality.

In the method according to the invention, injection system setpoint values for the activation of the injection system control elements are calculated on the basis of a setpoint torque by means of a combustion model, and gas path setpoint values for the activation of the gas path control elements are calculated by means of a gas path model, wherein the combustion model is adapted during the ongoing operation of the internal combustion engine. Furthermore, in said method, a quality measure is calculated by an optimizer in a manner dependent on the injection system setpoint values and the gas path setpoint values, and the quality measure is minimized by the optimizer by variation of the injection system setpoint values and gas path setpoint values within a prediction horizon. When a minimized quality measure has then been determined, the optimizer finally sets the injection system setpoint values and gas path setpoint values as being definitive for the setting of the operating point of the internal combustion engine.

The combustion model is adapted by means of a first Gaussian process model for depicting a base grid and by means of a second Gaussian process model for depicting adaptation data points. The data for the first Gaussian process model are obtained on a single-cylinder test stand. Extreme operating conditions can be set on the single-cylinder test stand, for example a very cold environment or a very high geodetic altitude. By means of subsequent physical modelling, all input variables are varied through a full range in order to cover the entire working range of the internal combustion engine. For system-related reasons, the data values in the first Gaussian process model only coarsely replicate the engine system in the normal operating range. It is however advantageous that, by means of the first Gaussian process model, a base grid with few data points but physically meaningful extrapolation behavior is described. The data for the second Gaussian process model are generated from a DoE test stand run of the internal combustion engine with a range in which running can be performed under steady-state conditions. For system-related reasons, the data values in the second Gaussian process model are therefore valid only for this steady-state range, albeit with high quality. The combination of the first and of the second Gaussian process model therefore encompasses operating ranges with real measured and extrapolated data values.

The quality of the second Gaussian process model is assessed on the basis of a confidence interval. A narrow confidence interval thus represents high quality, whereas a broad confidence interval represents relatively low quality. During ongoing operation, the position of a present adaptation data point is assessed with regard to its position relative to the valid confidence interval. The confidence interval corresponds to twice the standard deviation, that is to say a 95% confidence interval. If the present adaptation data point lies within the confidence interval, it supplements the second Gaussian process model. If the present adaptation data point lies outside the valid confidence interval, then the second Gaussian process model is altered by virtue of adaptation data points being removed from the second Gaussian process model until the present adaptation data point lies within the new confidence interval.

To reduce the outlay in terms of memory and in order to reduce the processing time, the total number of adaptation data points is compared with a threshold value. In the event of an overshooting of the threshold value, such a number of adaptation data points is removed that the new total number is lower than the threshold value. Those adaptation data points which have little or no influence on the quality of the second Gaussian process model are removed.

Likewise in order to reduce the processing time, it is provided that the first Gaussian process model for depicting a base grid is readapted by means of the second Gaussian process model. The readaptation is based on the requirement for the second Gaussian process to be equal to zero at the data points of the first Gaussian process. During the readaptation, each data point of the first Gaussian process model is imprinted with a timestamp. A priority can be determined on the basis of the change of the timestamp over time. In turn, a time period for the continued operation of the internal combustion engine can be estimated from the priority. In other words: A defective NOx sensor, for example, gives rise to a drift of the mean value in the first Gaussian process model over time. The priority corresponding to this then defines the remaining time period for the model-based continued operation of the internal combustion engine. By means of the priority, it is self-evidently also possible to identify unauthorized manipulation of the internal combustion engine.

The invention offers the known advantages of an adaptation, specifically a standardization of internal combustion engines of the same type series. In other words: The series variance is automatically reduced by means of the adaptation. By means of the readaptation of the first Gaussian process model by means of the second Gaussian process model, a self-learning system with error detection is replicated. Since the models are individually tunable and collectively replicate the internal combustion engine, the outlay in terms of tuning can be yet further reduced. The characteristic curves and characteristic maps that have hitherto been required are eliminated, without substitute. By means of the extrapolation capability of the models, reliable engine control variables are calculated both in dynamic, transient operation or in operating ranges which are seldom implemented. Furthermore, the intervals between the target values of the closed-loop control and the legal emissions limit values can be reduced.

BRIEF DESCRIPTION OF THE DRAWING

A preferred exemplary embodiment is shown in the figures. In the drawing.

DETAILED DESCRIPTION OF THE INVENTION

Figure 1:
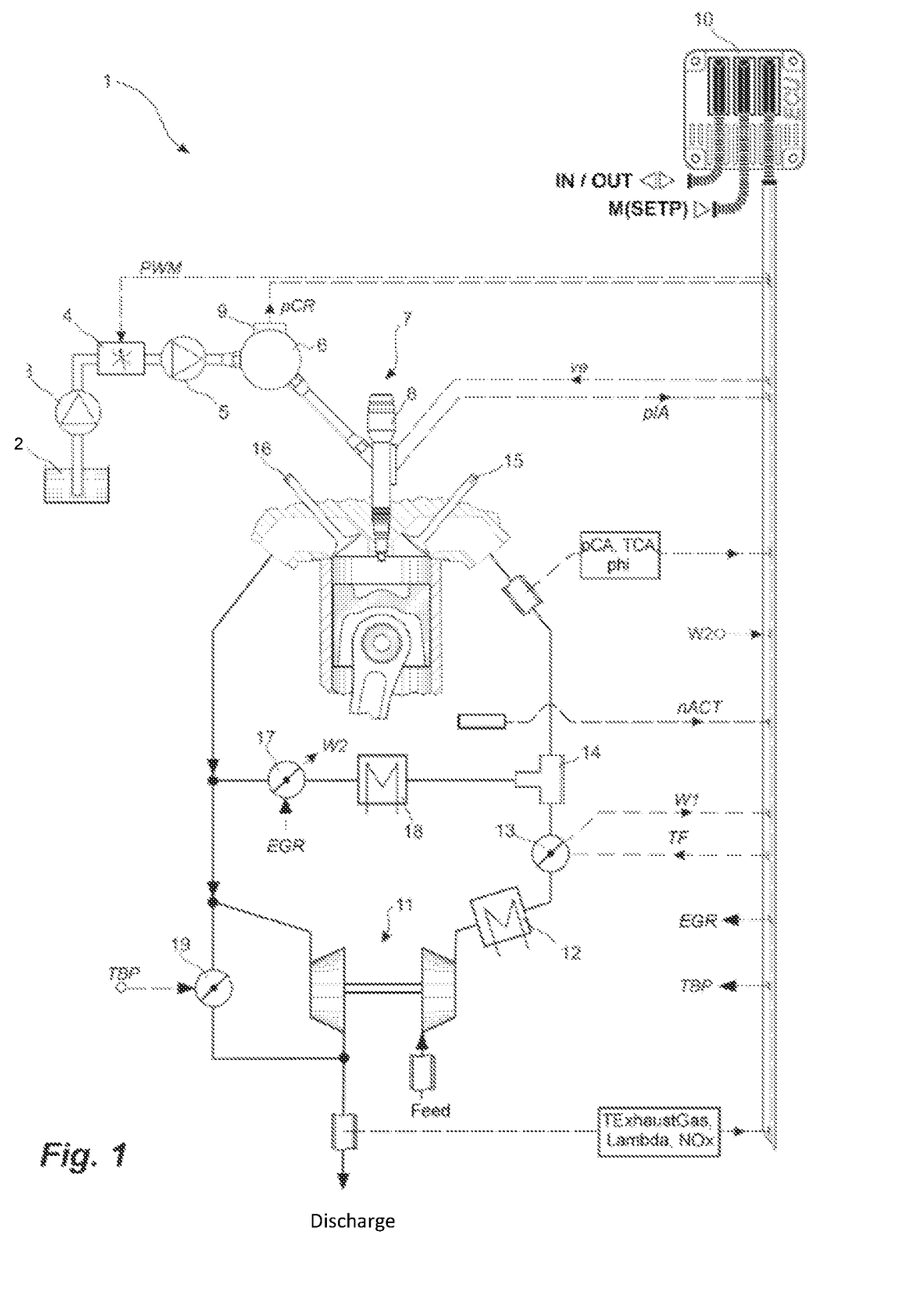
FIG. 1 shows a system schematic.

FIG. 1 shows a system schematic of an electronically controlled internal combustion engine 1 with a common rail system. The common rail system comprises the following mechanical components: a low-pressure pump 3 for conveying fuel out of a fuel tank 2, a variable intake throttle 4 for influencing the fuel volume flow passing through, a high-pressure pump 5 for conveying the fuel at elevated pressure, a rail 6 for storing the fuel, and injectors 7 for injecting the fuel into the combustion chambers of the internal combustion engine 1. The common rail system may optionally also be designed with individual accumulators, wherein an individual accumulator 8 is then for example integrated as an additional buffer volume in the injector 7. The further functionality of the common rail system is assumed to be known.

The illustrated gas path comprises both the air feed system and the exhaust-gas discharge system. Arranged in the air feed system are the compressor of an exhaust-gas turbocharger 11, a charge-air cooler 12, a throttle flap 13, an opening-in point 14 for the merging of the charge air with the recirculated exhaust gas, and the inlet valve 15. Arranged in the exhaust-gas discharge system are an outlet valve 16, the turbine of the exhaust-gas turbocharger 11 and a turbine bypass valve 19. An exhaust-gas recirculation path branches off from the exhaust-gas discharge system, in which exhaust-gas recirculation path an EGR control element 17, for the setting of the EGR rate, and the EGR cooler 18 are arranged.

The operation of the internal combustion engine 1 is determined by an electronic control unit 10 (ECU). The electronic control unit 10 comprises the conventional constituents of a microcomputer system, for example a microprocessor, I/O modules, buffer and memory modules (EEPROM, RAM). The operating data relevant for the operation of the internal combustion engine 1 are implemented in the memory modules as models. By means of said operating data, the electronic control unit 10 calculates the output variables from the input variables. The definitive input variable is a setpoint torque M(SETP), which is predefined by an operator as a power demand. The input variables of the control unit 10 which relate to the common rail system are the rail pressure pCR, which is measured by means of a rail pressure sensor 9, and optionally the individual accumulator pressure pIA. The input variables of the electronic control unit 10 which relate to the air path are an opening angle W1 of the throttle flap 13, the engine rotational speed nACT, the charge-air pressure pCA, the charge-air temperature TCA and the humidity phi of the charge air. The input variables of the electronic control unit 10 which relate to the exhaust-gas path are an opening angle W2 of the EGR control element 17, the exhaust-gas temperature TExhaustGas, the air-fuel ratio Lambda, and the NOx actual value downstream of the turbine of the exhaust-gas turbocharger 11. The further input variables (not illustrated) of the electronic control unit 10 are summarized by the reference designation IN, for example the coolant temperatures.

In FIG. 1, the following are illustrated as output variables of the electronic control unit 10: a signal PWM for the activation of the intake throttle 4, a signal ye for the activation of the injector 7 (start of injection/end of injection), a control signal TF for the activation of the throttle flap 13, a control signal EGR for the activation of the EGR control element 17, a control signal TBP for the activation of the turbine bypass valve 19, and an output variable OUT. The output variable OUT is representative of the further control signals for the open-loop and closed-loop control of the internal combustion engine 1, for example of a control signal for the activation of a second exhaust-gas turbocharger in the case of a multistage supercharging arrangement or a variable valve drive.

Figure 2:
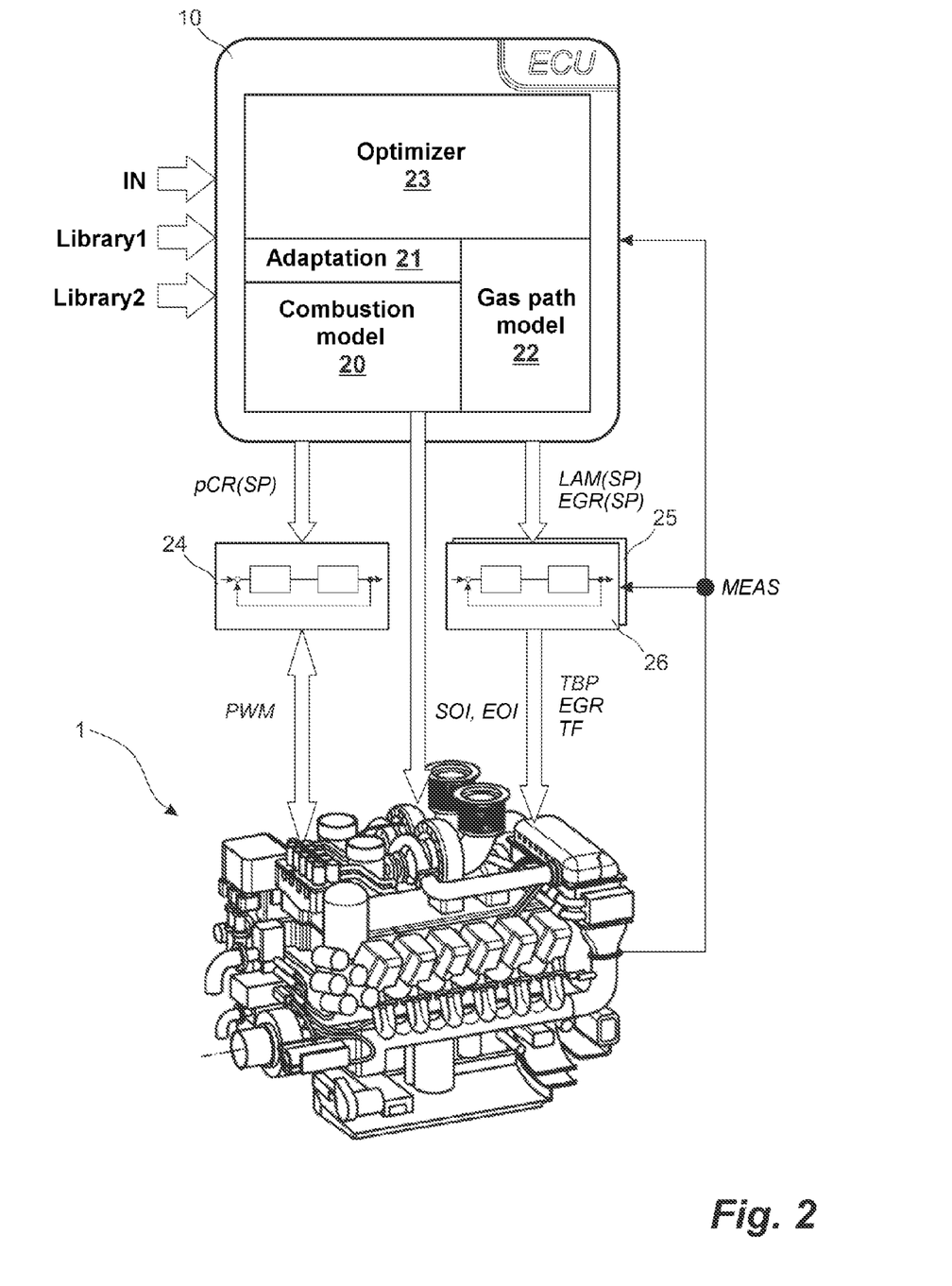
FIG. 2 shows a model-based system schematic.

FIG. 2 shows a model-based system schematic. In this illustration, the input variables of the electronic control unit 10 are a first library Library1, a second library Library2, measured variables MEAS and the collective reference designation IN, which represents the input variables illustrated in FIG. 1. The first library Library1 characterizes the operation of the internal combustion engine in accordance with the MARPOL (Marine Pollution) emissions class of the IMO or in accordance with the EU IV/Tier 4 final emissions class. The second library Library2 characterizes the internal combustion engine type and a maximum mechanical component loading, for example the peak combustion pressure or the maximum rotational speed of the exhaust-gas turbocharger. The input variable MEAS characterizes the both directly measured physical variables and auxiliary variables calculated therefrom. The output variables of the electronic control unit are the setpoint values for the subordinate control loops, the start of injection SOI and the end of injection EOI. A combustion model 20, an adaptation 21, a gas path model 22 and an optimizer 23 are arranged within the electronic control unit.

Both the combustion model 20 and the gas path model 22 replicate the system behavior of the internal combustion engine in the form of mathematical equations. The combustion model 20 replicates, in steady-state form, the processes during the combustion. By contrast to this, the gas path model 22 replicates the dynamic behavior of the air-conducting arrangement and of the exhaust-gas-conducting arrangement. The combustion model 20 comprises individual models, for example, for the generation of NOx and soot, for the exhaust-gas temperature, for the exhaust-gas mass flow and for the peak pressure. These individual models are in turn dependent on the boundary conditions in the cylinder and the parameters of the injection. The combustion model 20 is determined in the case of a reference internal combustion engine in a test stand run, the so-called DoE (Design of Experiments) test stand run. In the DoE test stand run, operating parameters and control variables are systematically varied with the aim of replicating the overall behavior of the internal combustion engine in a manner dependent on engine variables and environmental boundary conditions. The combustion model 20 is supplemented by the adaptation 21. The aim of the adaptation is to reduce the series variance of an internal combustion engine.

After activation of the internal combustion engine 1, the optimizer 23 firstly reads in the emissions class from the first library Library1 and reads in the maximum mechanical component loadings from the second library Library2. The optimizer 23 subsequently evaluates the combustion model 20, specifically with regard to the setpoint torque M(SETP), the emissions limit values, the environmental boundary conditions, for example the humidity phi of the charge air, the operating situation of the internal combustion engine and the adaptation data points. The operating situation is defined in particular by the engine rotational speed nACT, the charge-air temperature TCA and the charge-air pressure pCA. The function of the optimizer 23 now consists in evaluating the injection system setpoint values for the activation of the injection system control elements and the gas path setpoint values for the activation of the gas path control elements. Here, the optimizer 23 selects that solution with which a quality measure is minimized. The quality measure is calculated as an integral of the quadratic setpoint-actual deviations within the prediction horizon; for example in the form:

$$J=\int [w1(NOx(SETP)-NOx(ACT)]^2+[w2(M(SETP)-M(ACT)]^2+[w3(\ldots.)]+\ldots \quad (1)$$

In this, w1, w2 and w3 denote a corresponding weighting factor. As is known, the nitrogen oxide emissions arise from the humidity phi of the charge air, the charge-air temperature, the start of injection SOI and the rail pressure pCR. The adaptation 21 manipulates the actual values, for example the NOx actual value or the exhaust-gas temperature actual value.

The quality measure is minimized by virtue of the optimizer 23, at a first time, calculating a first quality measure, varying the injection system setpoint values and the gas path setpoint values, and, on the basis of this, predicting a second quality measure within the prediction horizon. From the deviation of the two quality measures in relation to one another, the optimizer 23 then specifies a minimum quality measure and sets this as being definitive for the internal combustion engine. For the example illustrated in the figure, these are, for the injection system, the setpoint rail pressure pCR(SP), the start of injection SOI and the end of injection EOI. The setpoint rail pressure pCR(SP) is the reference variable for the subordinate rail pressure closed-loop control circuit 24. The control variable of the rail pressure closed-loop control circuit 24 corresponds to the PWM signal for application to the intake throttle. Direct application to the injector (FIG. 1: 7) is performed upon the start of injection SOI and the end of injection EOI. For the gas path, the optimizer 23 indirectly determines the gas path setpoint values. In the example illustrated, these are a lambda setpoint value LAM(SP) and an EGR setpoint value EGR(SP) for specification for the subordinate lambda closed-loop control circuit 25 and the subordinate EGR closed-loop control circuit 26. The control variables of the two closed-loop control circuits 25 and 26 correspond to the signal TBP for the activation of the turbine bypass, the signal EGR for the activation of the EGR control element and the signal TF for the activation of the throttle flap. The returned measured variables MEAS are read in by the electronic control unit 10. The measured variables MEAS are to be understood to be both directly measured physical variables and auxiliary variables calculated therefrom. In the illustrated example, the lambda actual value LAM(ACT) and the EGR actual value AGR(ACT) are read in.

Figure 3:
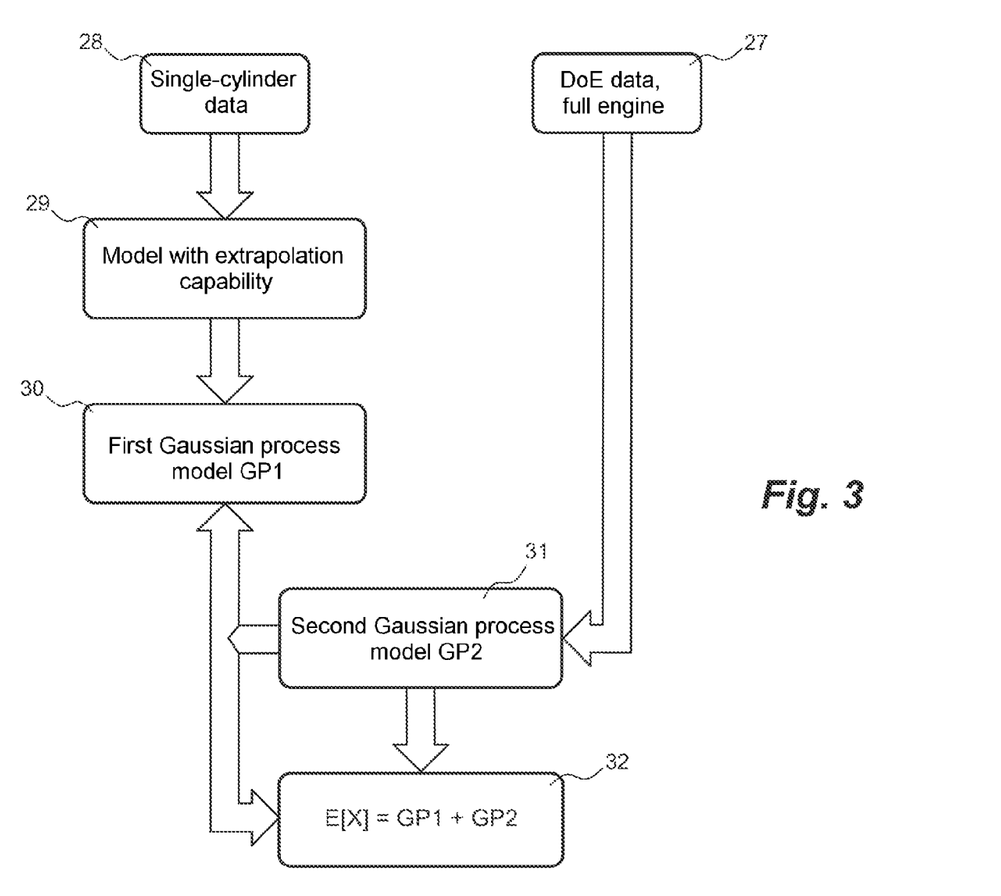
FIG. 3 shows a block circuit diagram.

FIG. 3 shows, in a block diagram, the interaction of the two Gaussian process models for the adaptation of the combustion model. Gaussian process models are known to a person skilled in the art, for example from DE 10 2014 225 039 A1 or DE 10 2013 220 432 A1. In very general terms, a Gaussian process is defined by a mean value function and a covariance function. The mean value function is commonly assumed to be zero, or a linear/polynomial profile is introduced. The covariance function specifies the relationship of arbitrary points. A first function block 27 comprises the DoE (Design of Experiments) data of the full engine. Said data are determined for a reference internal combustion engine in a test stand run by virtue of all variations of the input variables, over the entire range of adjustment thereof, being determined in the range of the internal combustion engine in which running can be performed under steady-state conditions. Said data characterize, with high accuracy, the behavior of the internal combustion engine in the range in which running can be performed under steady-state conditions. A second function block 28 comprises data obtained on a single-cylinder test stand. On the single-cylinder test stand, those operating ranges which cannot be tested in a DoE test stand run, for example high geodetic altitude or extreme temperatures, can be implemented. These few measurement data serve as a basis for the parameterization of a physical model which coarsely correctly reflects the global behavior of the combustion. The physical model coarsely replicates the behavior of the internal combustion engine under extreme boundary conditions. The physical model is completed by extrapolation, such that a normal operating range is coarsely correctly described. In FIG. 3, the model with extrapolation capability is denoted by the reference designation 29. From this, in turn, the first Gaussian process model 30 (GP1) for depicting a base grid is generated.

The merging of the two sets of data points forms the second Gaussian process model 31. Thus, operating ranges of the internal combustion engine which are described by the DoE data are also defined by these values, and operating ranges for which no DoE data are present are replicated by means of data of the physical model. Since the second Gaussian process model is adapted during ongoing operation, it serves for depicting the adaptation points. Very generally, the following thus applies for the model value (reference designation 32):

$$E[x] = GP1 + GP2 \qquad (2)$$

Here, GP1 corresponds to the first Gaussian process model for depicting the base grid, GP2 corresponds to the second Gaussian process model for depicting the adaptation data points, and the model value $E[x]$ corresponds to the input variable for the optimizer, for example a NOx actual value or an exhaust-gas temperature actual value. The double arrow in the figure illustrates two information paths. The first information path indicates the provision of data of the base grid from the first Gaussian process model 30 to the model value 32. The second information path indicates the readaptation of the first Gaussian process model 30 by means of the second Gaussian process model 31.

Figure 4:
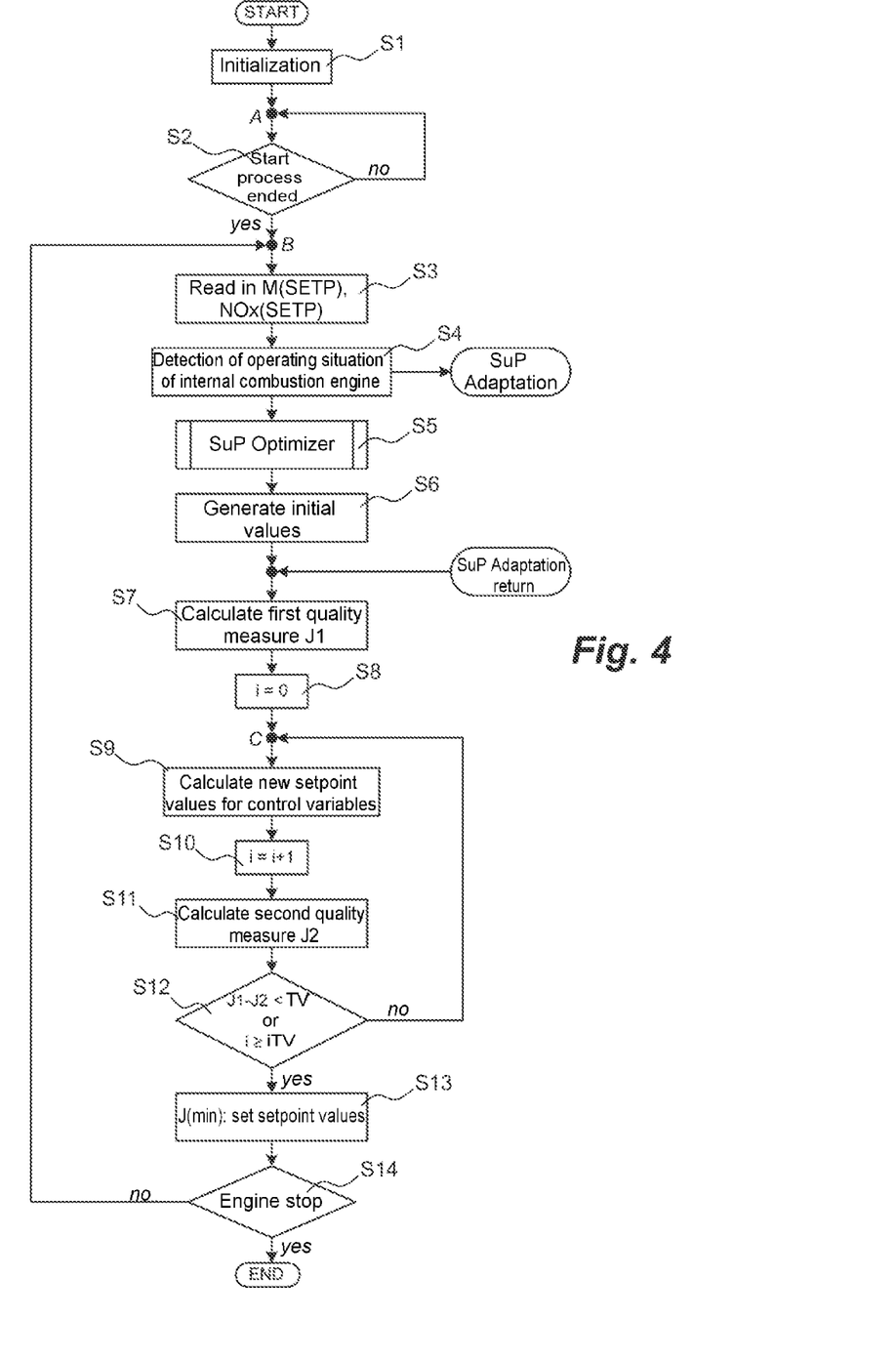
FIG. 4 shows a program flowchart.

FIG. 4 illustrates, in a program flowchart, a main program by means of which the optimizer optimizes the quality measure J within a prediction horizon. Said main program also includes a sub-program SuP Adaptation, by means of which adapted values for the optimizer are provided. The sub-program SuP Adaptation takes longer to run through than the main program, that is to say newly adapted values are not provided upon every run-through of the main program. After the initialization in S1, it is checked in S2 whether the start process has ended. If said start process is still taking place, interrogation result S2: no, a branch is followed back to the point A. If the start process has ended, then, in S3, the setpoint torque M(SETP) that can be predefined by the operator and the NOx setpoint value NOx(SETP) are read in. Following this, in S4, the operating situation of the internal combustion engine is detected. The operating situation is defined by means of the measured variables, in particular by means of the engine rotational speed nACT, the charge-air temperature TCA, the charge-air pressure pCA and the humidity phi of the charge air. The operating situation is processed further firstly in a sub-program Optimizer, step S5, and secondly in the sub-program SuP Adaptation. The sub-program will be discussed in conjunction with FIG. 5.

After the sub-program SuP Optimizer has been called up, the starting values, for example the start of injection SOI, are generated at S6. A first quality measure J1 is calculated on the basis of the equation (1) at S7, and an indexed variable i is set to zero at S8. Subsequently, at S9, the starting values are changed and are calculated as new setpoint values for the control variables. At S10, the indexed variable i is increased by one. On the basis of the new setpoint values, a second quality measure J2 is then predicted for the prediction horizon, for example for the next 8 seconds, at S11. At S12, in turn, the second quality measure J2 is subtracted from the first quality measure J1 and is compared with a threshold value TV. By means of the calculation of the difference between the two quality measures, the further progression of the quality measure is checked. Alternatively, on the basis of the comparison of the indexed variable i with a threshold value iTV, it is checked how often an optimization has already been performed. The two threshold value considerations are thus a termination criterion for a further optimization. If a further optimization is possible, interrogation result S12: no, then a branch is followed back to point C. Otherwise, at S13, the second quality measure J2 is set by the optimizer as a minimum quality measure J(min). The injection system setpoint values and the gas path setpoint values for specification for the corresponding control elements then result from the minimum quality measure J(min). Following this, at S14, it is checked whether an engine stoppage has been initiated. If this is not the case, interrogation result S14: no, then a branch is followed back to point B. The program flowchart is otherwise ended. A detailed description regarding the operating principle of the optimizer, including prediction, is known from the patent application with the official file reference DE 10 2017 005 783.4, which does not constitute a prior publication, and to which reference is hereby made.

Figure 5:
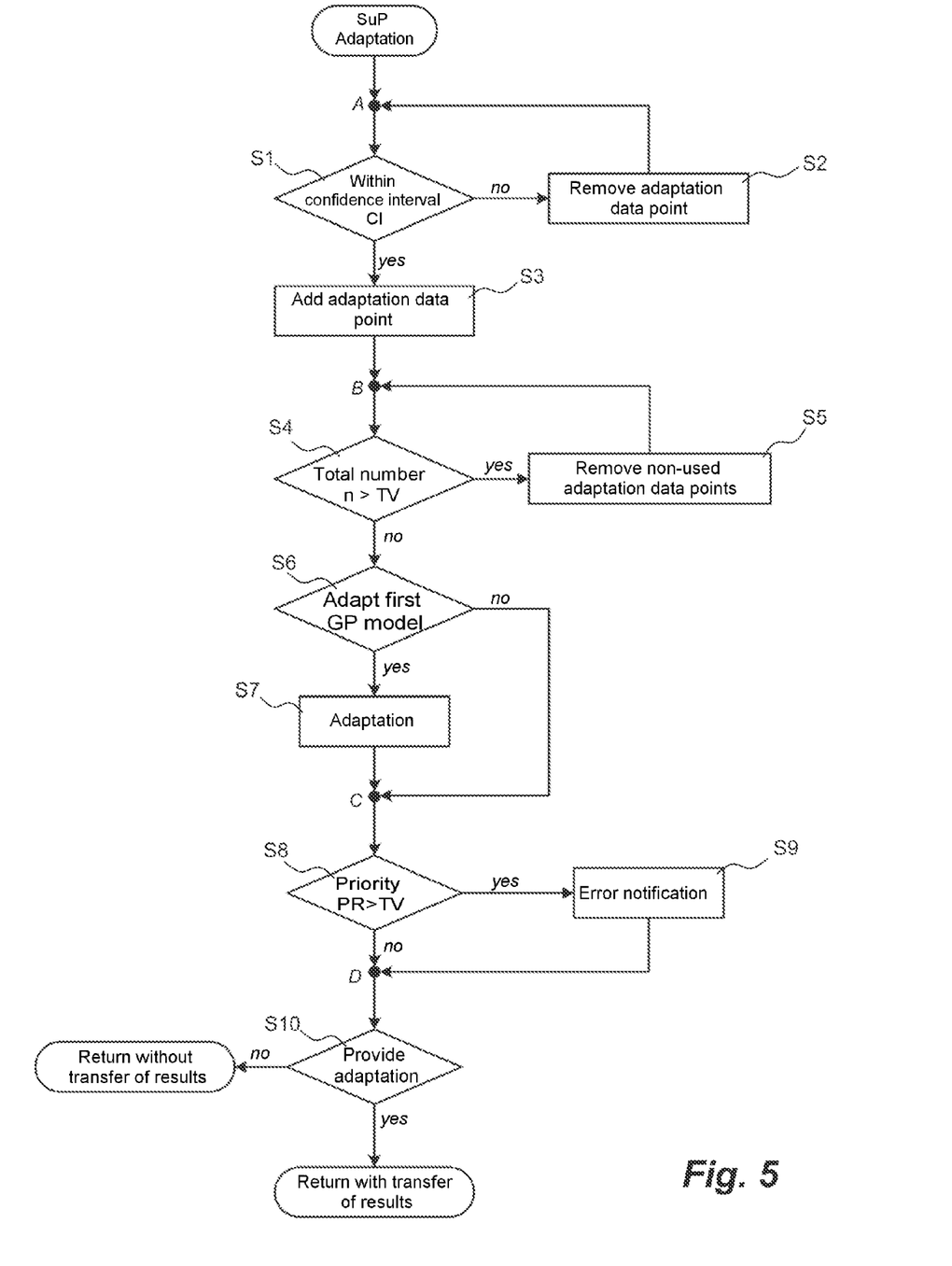
FIG. 5 shows a sub-program.
Figure 6A:
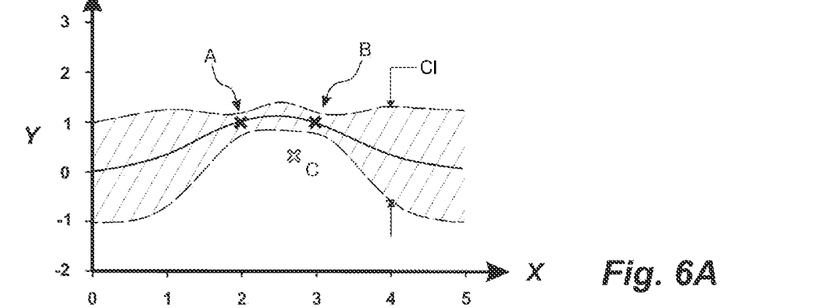
FIG. 6 shows a first adaptation example.
Figure 6B:
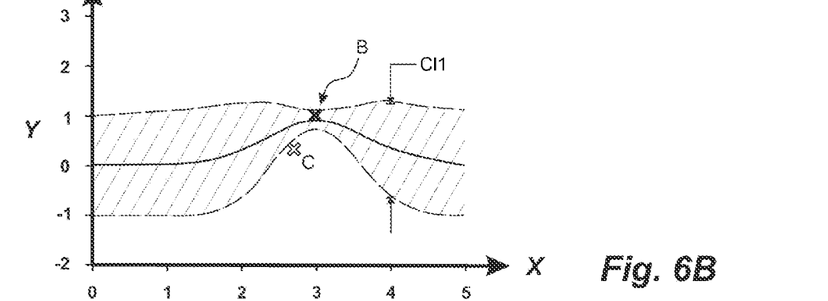
Figure 6C:
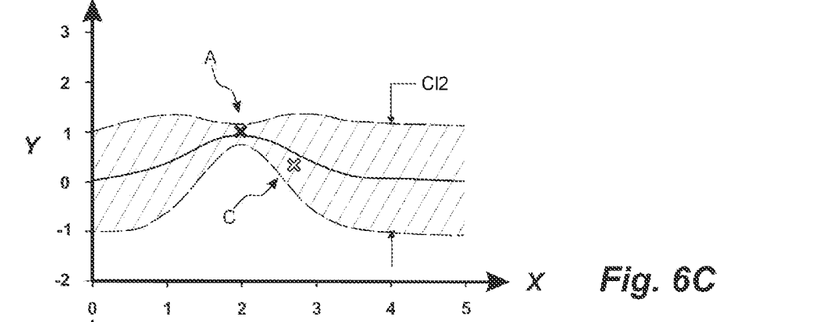
Figure 6D:
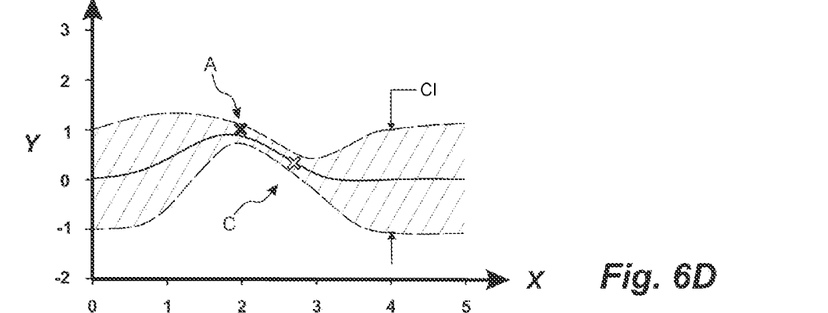

FIG. 5 illustrates the sub-program SuP Adaptation. At S1, it is checked whether the present data point lies within the valid confidence interval CI. If it lies outside the valid confidence interval CI, interrogation result S1: no, then a branch is followed to S2, and an adaptation data point that has already been stored is removed. Subsequently, a branch is followed back to point A, and it is checked again at S1 whether the present adaptation data point now lies in the new confidence interval. This situation is illustrated in FIG. 6 and will be discussed in conjunction with FIG. 6. Thus, in the loop S1 and S2, adaptation data points are removed from the second Gaussian process model until such time as the present adaptation data point lies within the new confidence interval. If it has been identified at S1 that the present data point lies within the confidence interval CI, interrogation result S1: yes, then at S3 the present adaptation data point is added to the second Gaussian process model. It is subsequently checked at S4 whether the total number n of adaptation data points is higher than a threshold value TV. If this is not the case, interrogation result S4: no, then the program sequence is continued at S6. Otherwise, at S5, that adaptation data point which has the least influence on the mean value is removed. Subsequently, a branch is followed back to point B, and the total number n is interrogated again at S4. Therefore, by means of the loop S4/S5, such a number of adaptation data points is removed from the second Gaussian process model that the total number n lies below the threshold value TV. Advantages are a reduced outlay in terms of memory and a faster run-through time.

At S6, it is checked whether the first Gaussian process model for depicting the base grid must be adapted. If this is not necessary, interrogation result S6: no, then the program sequence is continued at the point C. If an adaptation is necessary, interrogation result S6: yes, then the first Gaussian process model is adapted such that the expected value of the first Gaussian process model is readapted by means of the second Gaussian process model. The program sequence is subsequently continued at the point C. At S8, a priority PR is checked for overshooting of a threshold value. Every data point in the first Gaussian process model is imprinted with a timestamp. A change in the data point, that is to say a drift over time, changes the priority. If it is identified at S8 that the priority PR is higher than the threshold value TV, interrogation result S8: yes, then at S9, a warning notification and the remaining usage duration are output, and the program sequence is continued at S10. By contrast, if it is identified at S8 that the priority PR is lower than the threshold value TV, interrogation result S8: no, then the program sequence is continued at the point D and S10. By means of the interrogation of the priority, a sensor failure, for example of the NOx sensor, can be identified. Likewise, unauthorized manipulation of the internal combustion engine can be identified in this way. On the basis of the priority, it is estimated for how long model-based continued operation of the internal combustion engine is still possible despite a sensor defect. At S10, it is checked whether the adapted values should be used in the main program. In the case of a positive check, interrogation result S10: yes, then a return to the main program of FIG. 4 is performed with a transfer of the results to the main program. In the case of a negative check, interrogation result S10: no, then a return to the main program of FIG. 4 is performed without a transfer of results to the main program.

FIG. 6 illustrates the case in which the present adaptation data point does not lie in the valid confidence interval. The valid confidence interval is defined on the basis of the mean value MW (expected value My) and the covariance (Sigma$^2$). FIG. 6 comprises FIGS. 6A to 6D. For a clearer illustration, these are illustrated in two-dimensional form. Here, a variable X, which is representative of the input variables of the model, that is to say for example the start of injection SOI, the rail pressure pCR, the charge-air pressure pCA or the humidity phi of the charge air, is plotted on the abscissa. A variable Y, which is representative of adaptable model values, for example for NOx or the exhaust-gas temperature, is illustrated on the ordinate. Non-adaptable variables are for example the soot, the torque or the fuel consumption, which are likewise represented by means of equation (2). In practice, the variables X and Y are thus multi-dimensional. FIG. 6A illustrates a first adaptation data point A (2/1), a second adaptation data point B (3/1) and a present adaptation data point C (2.5/0). The present adaptation data point C does not lie within the valid confidence interval CI, which is illustrated by hatching in the figure. It is subsequently checked how the valid confidence interval CI (FIG. 6A) would change as a result of the removal of the first adaptation data point A (2/1). It can be seen from FIG. 6B that, despite the removal of the first adaptation data point A, the present adaptation data point C would, as before, lie outside the new confidence interval CI1. Therefore, not the first adaptation data point A but the second adaptation data point B (3/1) is removed. As illustrated in FIG. 6C, the present adaptation data value C now lies within the new confidence interval CI2. Therefore, the second Gaussian process model is adapted such that the present adaptation data point C (2.5/0) is adopted, and the first adaptation data point A (2/1) that has already been stored remains. The recalculation then gives rise to a new confidence interval CI, as illustrated in FIG. 6D.

Figure 7A:
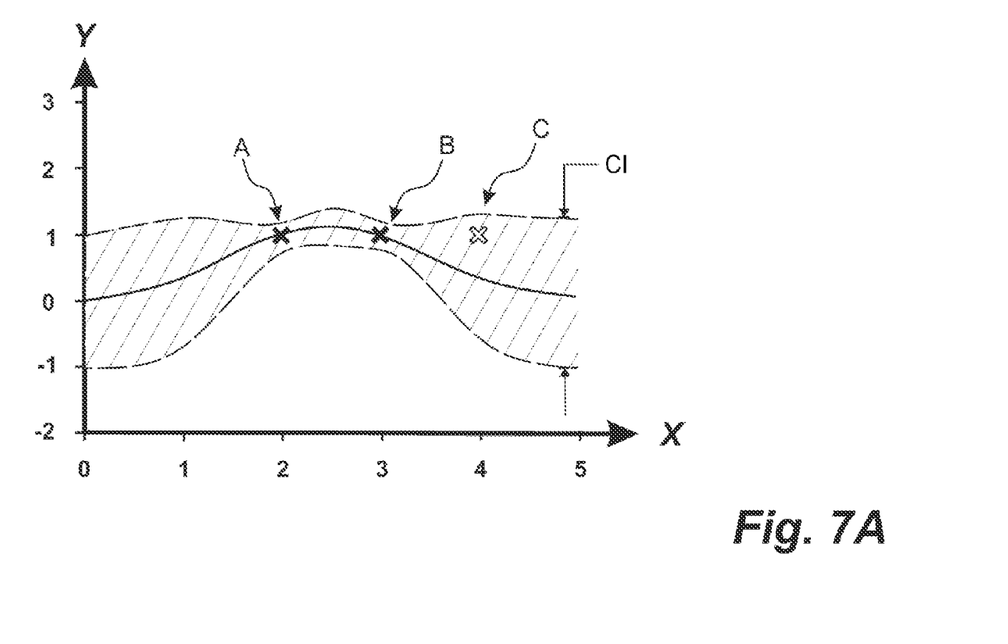
FIG. 7 shows a second adaptation example.
Figure 7B:
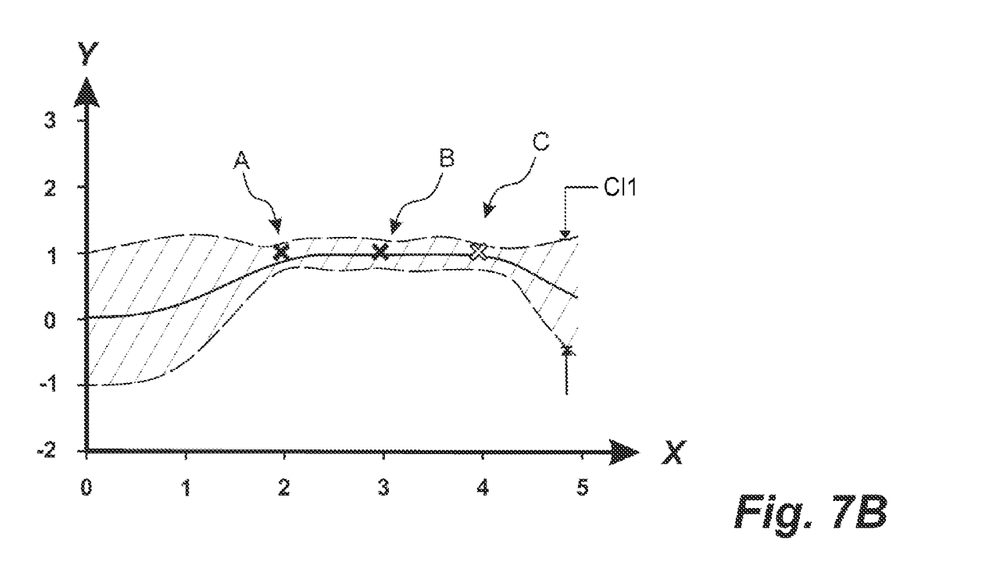

FIG. 7 illustrates the case in which the present adaptation data point lies within the present confidence interval CI. FIG. 7 comprises FIGS. 7A and 7B. The variable X plotted on the abscissa and the variable Y plotted on the ordinate correspond to the variables described in FIG. 6. FIG. 7A illustrates a first adaptation data point A (2/1), a second adaptation data point B (3/1) and a present adaptation data point C (4/1). Since the present adaptation data point C lies within the valid confidence interval CI, the present adaptation data point C is adopted into the second Gaussian process model, and the new confidence interval CI is subsequently calculated. Owing to the recalculation of the confidence interval, this is considerably narrower between the adaptation data points A to C. In this regard, see FIG. 7B. A narrower confidence interval demonstrates improved quality.

Figure 8A:
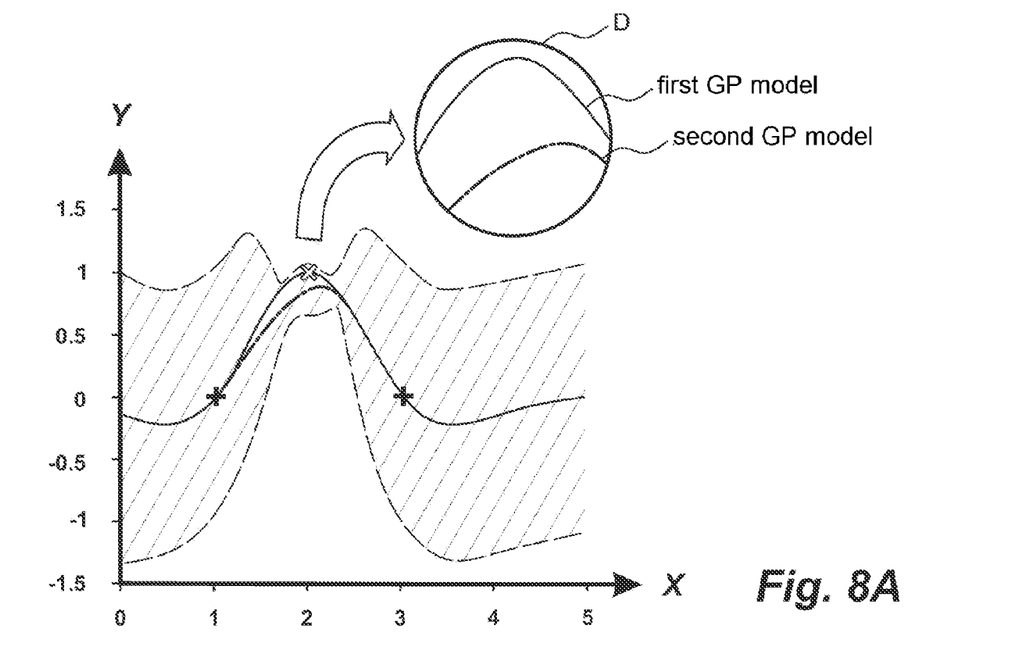
FIG. 8 shows a third adaptation example.
Figure 8B:
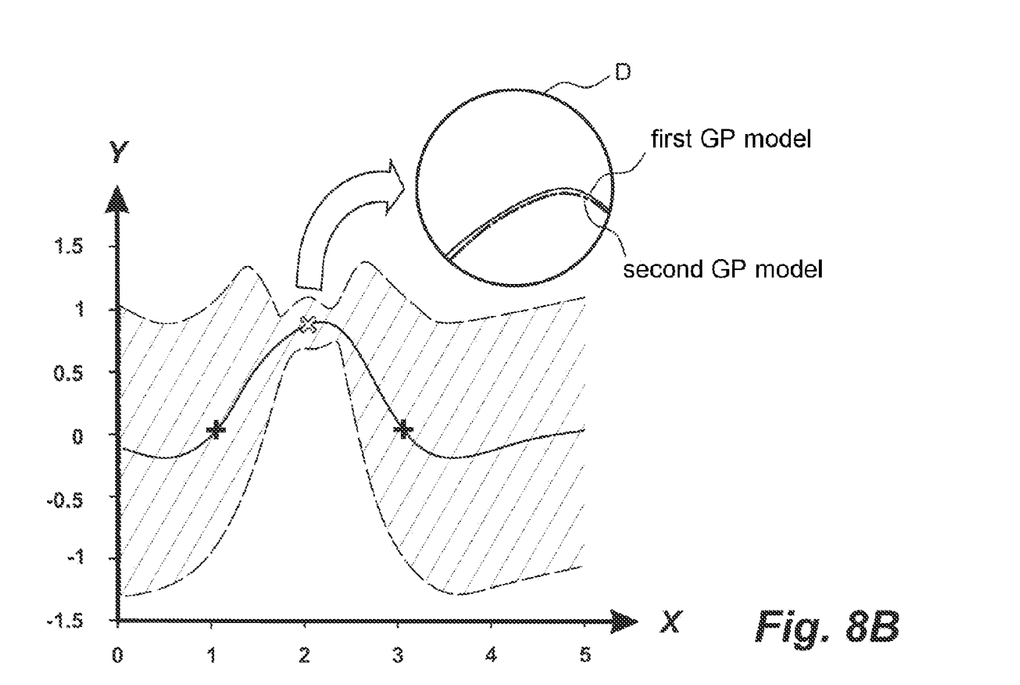

FIG. 8 illustrates the case of a readaptation of the first Gaussian process model by means of the second Gaussian process model. FIG. 8 comprises FIGS. 8A and 8B. FIG. 8A shows, in the detail D, that the first Gaussian process model (solid line) differs from the mean value of the second Gaussian process model (dash-dotted line). The readaptation occurs such that the expected value of the first Gaussian process model is adapted so as to correspond to the adaptation data points of the second Gaussian process model, see FIG. 8B.

REFERENCE DESIGNATIONS

1 Internal combustion engine
2 Fuel tank
3 Low-pressure pump
4 Intake throttle
5 High-pressure pump
6 Rail
7 Injector
8 Individual accumulator
9 Rail pressure sensor
10 Electronic control unit
11 Exhaust-gas turbocharger
12 Charge-air cooler
13 Throttle flap
14 Opening-in point
15 Inlet valve
16 Outlet valve
17 EGR control element (EGR: exhaust-gas recirculation)
18 EGR cooler
19 Turbine bypass valve
20 Combustion model
21 Adaptation
22 Gas path model
23 Optimizer
24 Rail pressure closed control loop
25 Lambda closed control loop
26 EGR closed control loop
27 First function block (DoE data)
28 Second function block (single-cylinder data)
29 Model
30 First Gaussian process model (GP1)
31 Second Gaussian process model (GP2)
32 Model value

The invention claimed is:
1. A method for model-based open-loop and closed-loop control of an internal combustion engine, comprising the steps of: calculating injection system setpoint values for activating injection system control elements in a manner dependent on a setpoint torque by a combustion model; calculating gas path setpoint values for activating gas path control elements by a gas path model; adapting the combustion model during ongoing operation of the internal combustion engine; calculating a quality measure by an optimizer in a manner dependent on the injection system setpoint values and the gas path setpoint values; minimizing the quality measure by the optimizer by varying the injection system setpoint values and the gas path setpoint values within a prediction horizon; and, setting the injection system setpoint values and the gas path setpoint values by the optimizer, based on the minimized quality measure, as being definitive for setting an operating point of the internal combustion engine.

2. The method according to claim 1, including adapting the combustion model by a first Gaussian process model for depicting a base grid and by a second Gaussian process model for depicting adaptation data points.

3. The method according to claim 2, including assessing the quality of the second Gaussian process model based on a confidence interval.

4. The method according to claim 3, including, in the second Gaussian process model, adopting a present adaptation data point that lies within a present confidence interval.

5. The method according to claim 3, including, when a present adaptation data point lies outside the confidence interval, iteratively removing previously stored adaptation data points from the second Gaussian process model until a present adaptation data point lies within a new confidence interval.

6. The method according to claim 4, including comparing a total number of the adaptation data points with a threshold value, and, when there is an overshooting of the threshold value, removing such a number of adaptation data points that a new total number is lower than the threshold value.

7. The method according to claim 6, including readapting the first Gaussian process model for depicting a base grid by way of the second Gaussian process model.

8. The method according to claim 7, including imprinting each data point of the first Gaussian process model with a timestamp, determining a priority based on a change of the timestamp, and estimating continued operation of the internal combustion engine dependent on the priority.

* * * * *